United States Patent
Wang

(10) Patent No.: US 8,908,587 B2
(45) Date of Patent: Dec. 9, 2014

(54) CHANNEL FEEDBACK IN OFDM SYSTEMS

(76) Inventor: Xiao-an Wang, Allentown, PA (US)

( * ) Notice: Subject to any disclaimer, the term of this patent is extended or adjusted under 35 U.S.C. 154(b) by 203 days.

(21) Appl. No.: 13/419,592

(22) Filed: Mar. 14, 2012

(65) Prior Publication Data

US 2013/0242841 A1 Sep. 19, 2013

(51) Int. Cl.
*H04H 20/71* (2008.01)
*H04W 72/00* (2009.01)
*H04L 5/00* (2006.01)

(52) U.S. Cl.
CPC ............. *H04W 72/005* (2013.01); *H04L 5/00* (2013.01)
USPC ........................................................ 370/312

(58) Field of Classification Search
CPC .................................................... H04W 72/00
USPC ......................................................... 370/312
See application file for complete search history.

(56) References Cited

U.S. PATENT DOCUMENTS

| | | | |
|---|---|---|---|
| 6,922,440 B2 * | 7/2005 | Yu et al. | 375/233 |
| 7,118,536 B2 * | 10/2006 | Haberland et al. | 600/538 |
| 8,040,847 B2 | 10/2011 | Sadri et al. | |
| 8,040,970 B2 * | 10/2011 | Pare, Jr. | 375/295 |
| 2009/0016425 A1 | 1/2009 | Hui et al. | |
| 2009/0192805 A1 * | 7/2009 | Topchy et al. | 704/500 |
| 2013/0201912 A1 * | 8/2013 | Sheng et al. | 370/328 |

* cited by examiner

*Primary Examiner* — Dang Ton
*Assistant Examiner* — Nourali Mansoury

(57) ABSTRACT

Methods and apparatus of channel feedback are disclosed. In OFDM systems, the channel is acquired in the frequency domain. A generic multipath model for wireless channels, however, reveals that the time-domain parameters of the channel require much smaller data than the frequency-domain representation of the channel. Means to extracting the time-domain parameters from the frequency-domain channel samples are described for both the continuous time domain and the discrete time domain. Refinements of the time-domain parameters via minimizing a frequency-domain matching error are also described, which further improve the quality of the channel feedback and reduce the feedback overhead. Channel feedback with the time-domain parameters requires only a small fraction of the feedback overhead that is needed by existing channel feedback schemes, and maintains consistently superior performances over wireless channels of various delay spreads, short or long.

18 Claims, 5 Drawing Sheets

CHANNEL FEEDBACK IN OFDM SYSTEMS

BACKGROUND

1. Field of Application

The following description relates generally to telecommunications systems and wireless communications systems.

2. Prior Art

A typical wireless cellular network comprises many cells, with one or more base stations at each cell. A mobile user within a cell communicates with its serving base station of the cell. Since the locations of mobile users within a cell are random, the quality of the channel between a mobile user and its serving base station can vary significantly. For example, consider the two mobile users 120 and 122 in FIG. 1. Both mobile users 120 and 122 are in the same cell served by base station 112. Mobile user 120 is very close to base station 112, thus the quality of the channel between mobile user 120 and base station 112 can be fairly good. High data throughput can be achieved between mobile user 120 and base station 112.

On the other hand, mobile user 122 is at the edge of its serving cell and much further away from base station 112. In the downlink channel in which base station 112 sends signal to mobile user 122, the strength of the downlink signal that mobile user 122 receives attenuates more due to the increased distance. Further, since mobile user 122 is also closer to neighbor cells, it is also subjected to much stronger interferences of the signals from base stations 114 and 116 of neighbor cells. Consequently, the downlink channel quality can be very poor at the cell edge. In the uplink channel where mobile user 122 sends signal to base station 112, the uplink signal of mobile user 122 is also corrupted by other mobile users 124 and 126 in neighbor cells. Thus at the cell edge, the uplink channel quality can also be very poor. As a result, the data throughput at the cell edge can be much lower than the peak data rate achievable when a mobile user is in the very proximity of a base station. The low data throughput at the cell edge averages down the overall data throughput of the entire cell, thus significantly reducing the network performance.

Recently, in an effort to improve the network performance in terms of the data throughput, multipoint broadcasting schemes have been introduced to wireless cellular networks. Refer to FIG. 1, where mobile user 122 is connected to base station 112, mobile user 124 to base station 114, and mobile user 126 to base station 116. Without the multipoint broadcasting, each base station would communicate to its respective mobile user individually. Thus for mobile user 122, the signals it hears from base stations 114 and 116 appear as noises or interferences. If, as shown in FIG. 1, mobile user 122 is at the cell edge, then the interferences from base stations 114 and 116 can be much stronger than the signal from base station 112, and consequently mobile user 122 suffers much poorer communication quality, resulting in much lower data throughput.

A multipoint broadcasting scheme aims at increasing the cell-edge performance and can be described as follows. Refer to FIG. 1 where an example multipoint broadcasting system can be identified. Base stations 112, 114, and 116 form a set of collaborating multipoint broadcasters. Mobile users 122, 124, and 126 form a set of recipients in the multipoint broadcasting system. In the multipoint broadcasting system in FIG. 1, base stations 112, 114, and 116 transmit the combinations of the signals intended for mobile users 122, 124, and 126. For each base station, the combination "weight" for each mobile user signal can be different. Through elaborate algorithms, the signals are combined at each base station in such a way that when the transmitted signals from base stations 112, 114, and 116 arrive at mobile user 122, the signals for mobile users 124 and 126 are cancelled out or minimized, while the signal for mobile user 122 is maximized or enhanced, thus the signal quality of mobile user 122 improves significantly. Similarly, mobile users 124 and 126 will also see significant improvement in the quality of their respective signals. The combining of the signals at each base station is commonly referred to as "pre-coding". The combining weights for each mobile-user signal and for each base station constitute the elements in a so called "pre-coding matrix".

The signals from base stations in a cellular network are broadcast in nature. Thus a multipoint transmission scheme creates a set of multipoint broadcasting channels. With the ability to completely cancel the interference and to create clean channels for each mobile user, multipoint broadcasting channels are shown to have a capacity, a measure of the data throughput of the network, several times that of the traditional cellular networks. Multipoint broadcasting schemes have been adopted by advanced versions of LTE (long-term evolution, of the currently deployed third generation wireless cellular networks), under the name of "coordinated multipoint transmission", or CoMP. The name follows from the fact that neighboring base stations coordinate to achieve multipoint broadcasting.

While multipoint broadcasting can bring tremendous benefits to wireless cellular networks, its performance depends critically on the availability of the downlink-channel information at the collaborating base stations. Consider the downlink multipoint broadcasting in FIG. 1. For the purpose of the interference cancellation, each of the base stations must have the channel information on all downlink channels between a base station and a mobile user. Generally, base stations are able to acquire only the uplink-channel information, and the downlink-channel information has to be acquired from the feedback by mobile users. The amount of the downlink-channel feedback data in LTE networks, however, can be extremely large for the following reasons. First, an LTE network utilizes very wide bandwidths with which the channel information grows proportionally. Second, wireless channel changes rapidly, which requires high feedback rate. Third, for applications such as multipoint broadcasting, there can be many downlink channels. For example, in the multipoint broadcasting system in FIG. 1, there are three base stations and three mobile users, thus there are nine downlink channels. Moreover, if base stations and/or mobile users have more than one antenna, as it has been increasingly the case, the number of downlink channels is further multiplied by the number of base station antennas and by the number of mobile user antennas. Fourth, for base stations to reliably recover the downlink-channel information, the feedback data has to be error-control coded, which further increases the effective feedback data size.

The huge downlink-channel feedback data results in extremely high feedback overhead. Since the downlink-channel feedback uses the uplink, the uplink capacity is reduced materially, and, in many cases, the feedback data leaves no room for the useful user data in the uplink.

There have been methods for reducing the feedback data size. One approach is to feed back only certain channel statistics, not the full channel information. This reduces the feedback overhead to an acceptable level at the expense of sacrificing most of the benefit of multipoint broadcasting. The improvement to the capacity of the cellular network is reduced from many folds to incremental. Such a high price is obviously unacceptable. Another approach is to use data compression techniques to compress the feedback data. This results in incremental reductions in the total feedback data but does not fundamentally change the fact that the feedback overhead is still unacceptably high.

Yet another approach is to use the time-domain representation of the channel for feedback. This is based on the assumption that the channel delay spread is short. The frequency-domain channel can be transformed into the time domain, and then truncated within the delay spread of the channel. While such a time-domain truncation approach may reduce the feedback overhead for short delay-spread channels, it falls short of its goal with channels with long delay spread. In fact, the time-domain channel samples spanned by the delay spreads of many typical wireless channels are often similar in size as the frequency-domain channel samples. This is particularly frequent at the cell edge where multipoint broadcasting is mostly desired and the efficient channel feedback is mostly needed.

The feedback overhead thus remains to be a major barrier to successful implementation of multipoint broadcasting in LTE networks. Since LTE has been rapidly adopted by the wireless industry as the future wireless cellular technology, the enormous feedback overhead is also a major barrier to multi-fold improvement of the wireless cellular network. Thus a strong need exists for a method, apparatus, and system that provide efficient downlink-channel feedback for LTE systems without compromising the capacity for useful data.

SUMMARY

The following is a summary of one or more aspects in order to provide a basic understanding of such aspects. Some concepts of one or more aspects are presented in a simplified form as a prelude to the more detailed descriptions that are to be presented later.

In certain aspects of the subject disclosure, the channel estimation is obtained from the frequency domain. Based on a continuous time-domain channel model, the time-domain parameters are derived from the frequency-domain channel samples. The time-domain parameters in the continuous time domain include the number of multipaths, multipath delays, and multipath amplitudes. The time-domain parameters require a much smaller data size to describe than the frequency-domain channel samples, regardless of the delay spread of the channel, thereby incurring a much smaller feedback overhead.

In some aspects of the subject disclosure, the time-domain parameters are derived via recursive minimization of the frequency-domain matching error. Recursive minimization is more computationally efficient, and provides convenient ways to determining the number of multipaths, one of the time-domain parameters.

In some further aspects of the subject disclosure, the time-domain parameters from the recursive minimization can be further refined. The refined time-domain parameters can be obtained by solving the full-scale minimization problem with the time-domain parameters from the recursive minimization as the initial guess. Alternatively, the multipath amplitudes can be refined by minimizing the frequency-domain matching error, given the multipath delays from the recursive minimization.

In some other aspects of the subject disclosure, the time-domain parameters can be derived in the discrete time domain. Accordingly, the time-domain parameters include the number, indices, and amplitudes of the channel taps. The frequency-domain channel samples are transformed to the time domain via inverse discrete Fourier transform (IDFT). Channel taps are then selected based on the strengths of the IDFT outputs. Like in the continuous time domain, the time-domain parameters obtained in the discrete time domain have a much smaller data size than the frequency-domain channel samples, regardless of the delay spread of the channel.

In some more aspects of the subject disclosure, spectrum fill-in is used for the unknown frequency-domain channel samples. Spectrum fill-in creates a smooth spectrum within the sampling bandwidth, thereby reducing the number of feedback channel taps.

In still some other aspects of the subject disclosure, the amplitudes of the channel taps are selected to minimize the frequency-domain matching error at given indices of the channel taps, instead of using the IDFT outputs as the amplitudes of the channel taps. This further reduces the frequency-domain matching error and the number of feedback channel taps.

Accordingly several advantages are to provide means of efficient channel feedback with much reduced feedback overhead, which makes it possible to retain the full benefits of multipoint broadcasting, and to improve the wireless network capacity multi-fold without sacrificing the uplink capacity. Still further advantages and novel features will become apparent from a study of the following description and the accompanying drawings.

BRIEF DESCRIPTION OF THE DRAWINGS

FIG. 9 illustrates an example block diagram of the strongest channel-tap feedback with spectrum fill-in.

DETAILED DESCRIPTION

The disclosed subject matter will now be described more fully hereinafter with reference to the accompanying drawings, in which some, but not all aspects or embodiments, are shown with like numerals referring to like elements throughout the description. Various aspects may be embodied in many different forms and should not be construed as limited to the embodiments set forth herein. Specific details are described for the purpose of providing a thorough understanding of the subject innovation. It may be evident, however, that the disclosed subject matter may be practiced without these specific details. In other instances, well-known methods, procedures, and components have not been described in detail so as not to obscure the subject innovation.

Figure 1:
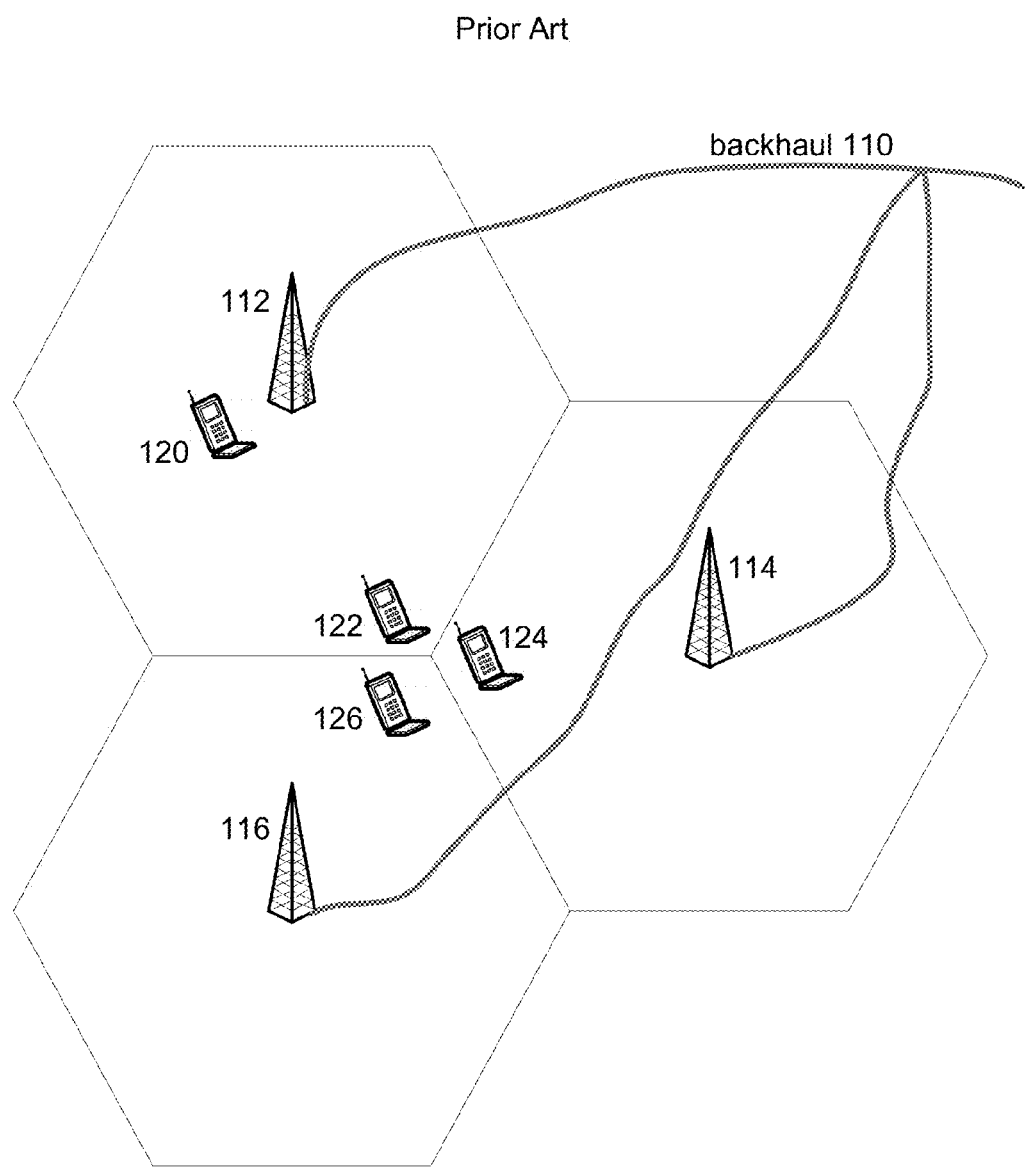
FIG. 1 illustrates a wireless cellular network that comprises a multipoint broadcasting system.
Figure 2:
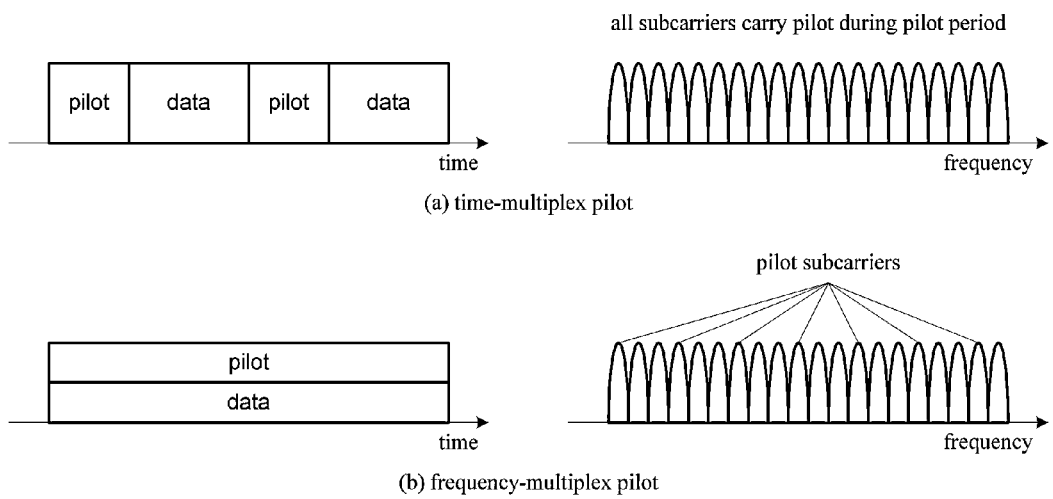
FIG. 2 illustrates two typical pilot patterns in OFDM systems: time-multiplex pilot and frequency-multiplex pilot.

In an orthogonal-frequency division multiple-access (OFDM) system, the pilot is transmitted in designated subcarriers. FIG. 2 illustrates two typical pilot patterns in OFDM systems: time-multiplex pilot and frequency-multiplex pilot. In a time-multiplex pilot, the pilot and data are transmitted in a time-multiplex fashion. During the time for pilot transmission, all the subcarriers are carrying the pilot signal. A frequency-multiplex pilot, on the other hand, is transmitted with the data simultaneously in time. In frequency domain, certain subcarriers are assigned to carry the pilot signal. Generally the pilot subcarriers are chosen to be roughly uniformly distributed so that channel information at non-pilot subcarriers can be reasonably interpolated from the neighbor pilot subcarriers.

In practice, the time-multiplex and the frequency-multiplex pilot patterns can be combined in various ways to form hybrid pilot patterns. For example, the pilot patterns in an LTE network, which is an OFDM system, are multiplexed with data both in the time domain and in the frequency domain. In a 20-MHz LTE network, there are 1201 subcarriers, and about 400 of them carry the pilot signal. In other words, the 20-MHz channel is described by about 400 frequency-domain samples.

For multipoint broadcasting, the collaborating base stations in an LTE network need to have the knowledge of the downlink channel via the feedback of mobile user recipients. The feedback of the frequency-domain channel samples, however, results in unacceptably high overhead, which diminishes the uplink capacity, or even makes the uplink unusable for carrying useful data.

A wireless channel can be modeled in the continuous time domain as follows:

$$h(t) = \sum_{l=0}^{L-1} \alpha_l \delta(t - \tau_l) \quad (1)$$

where L is the number of multipaths, $\alpha_l$ and $\tau_l$ is the complex amplitude and the propagation delay of the l-th path, respectively. The number, the complex amplitudes, and the propagation delays of the multipaths form the set of "continuous time-domain parameters". Hereinafter the term "complex amplitude" will simply be referred to as "amplitude" when the context is clear. The corresponding frequency-domain channel is then $$H(\omega) = \sum_{l=0}^{L-1} \alpha_l e^{-j\omega\tau_l} \quad (2)$$

The channel estimation in an OFDM system generates estimates $H_k$ of $H(\omega_k)$ at discrete frequency points $\omega_k$, k=0, 1, ..., K−1 with the channel bandwidth, where the pilot subcarriers are located, and where K is the number of frequency-domain channel samples. Hereinafter the term "channel bandwidth" refers to the bandwidth of the channel through which the signal of interest passes. The frequency-domain channel estimates can be averaged over multiple OFDM symbols to improve the accuracy. Time-domain trimming can also be used to improve the estimation accuracy. Time-domain trimming can be described as follows. Let $\{\hat{H}k\}=\{\hat{H}_k, k=0, 1, ..., K-1\}$ be an initial estimate of the frequency domain channel samples. Let $\{\hat{h}_n\}=\{\hat{h}_n, n=0, 1, ..., N-1\}$ be the time-domain representation of $\{\hat{H}_k\}$. For example, if $\{\hat{H}_k\}$ is uniformly spaced, $\{\hat{h}_n\}$ can be the inverse discrete Fourier transform (IDFT) of $\{\hat{H}_k\}$ with N=K. If a priori information on the channel delay spread $L_{ch}$ is available, i.e., $h_n=h(nT_s)=0$ if $n>L_{ch}$, where $T_s$ is the sampling interval, the last $N-L_{ch}-1$ time-domain channel samples can be replaced by zeros to get the time-domain trimmed channel samples:

$$\{\hat{h}_0, \hat{h}_1, ..., \hat{h}_{L_{ch}}, \underbrace{0, ..., 0}_{N-L_{ch}-10s}\}$$

The frequency-domain representation $\{H_k\}$ of the time-domain trimmed channel samples can then be used as an improved estimate of the frequency-domain channel samples. If $\{\hat{h}_n\}$ is obtained from the IDFT of $\{\hat{H}_k\}$, $\{\hat{H}_k\}$ can be obtained by the discrete Fourier transform (DFT) of the time-domain trimmed channel samples. The information on the channel spread $L_{ch}$ can be obtained from the accumulation of the channel statistics, field measurements, empirical data, etc.

While K can be on the order of several hundreds or more, the number of the time-domain parameters of the channel can be very small. In Eq. (1), the time-domain parameters are L, $\alpha_l$, and $\tau_l$. In typical wireless channels, the number of multipaths is less than 10 (In theory, there can be infinitely many multipaths. But in wireless propagation environment, the multipaths tend to appear in clusters, the multipaths in each cluster having very small differences in propagation delays such that all multipaths in a cluster can be represented by a single effective multipath). One way to extract the time-domain parameters from the frequency-domain channel estimates $H_k$ is to solve the following minimization problem:

$$\text{minimize } J(L, \alpha_0, ..., \alpha_{L-1}, \tau_0, ..., \tau_{L-1}) = \quad (3)$$

$$\sum_{k=0}^{K-1} \left| \sum_{l=0}^{L-1} \alpha_l e^{-j\omega_k \tau_l} - H_k \right|^p$$

where $J(L, \alpha_0, ..., \alpha_{L-1}, \tau_0, ..., \tau_{L-1})$ is referred to as the frequency-domain matching error, p>0 is referred to as the error norm. For example, p=2 results in the familiar minimum-square error (MSE) solution, while a very large p leads to the minimum-maximum error solution. It can be appreciated that the frequency-domain matching error can also take other appropriate forms than Eq. (3). The minimization in Eq. (3) is referred to as the full-scale minimization hereinafter, to distinguish from the recursive minimization that will be described later.

The number of the multipaths L is an integer, so searching for the optimum L in the full-scale minimization problem in Eq. (3) may require large amount of computations. One approach to reducing the computations is to have an initial estimate of L prior to minimization. L is closely related to the delay profile of the channel, i.e., the channel energy distribution in time domain. Thus L, or the range of L, may be estimated from the channel delay profile. The computations can also be reduced by making use of the fact that the channel delay profile and L change more slowly compared to the multipath amplitudes. Once an optimum L is found, the same L can be used in several subsequent minimization sessions. When L need to be updated, it can be assumed that the new optimum $L_{new}$ is not very far away from the previous optimum $L_{old}$. For example, the search candidates for $L_{new}$ can be restricted to the set $\{L_{old}-1, L_{old}, L_{old}+1\}$.

It can be appreciated that feedback of the time-domain parameters requires much smaller overhead than feedback of the frequency-domain channels. Consider the 20-MHz LTE network for example. Neglecting the quantization effect, about 400 complex numbers for the frequency-domain channel need to be fed back. In contrast, assuming there are 10 multipaths, only 10 complex numbers for multipath amplitudes, 10 real numbers for multipath delay, and one integer for the number of multipaths are needed for time-domain parameter feedback, less than 4% of the overhead for the frequency-domain channel feedback.

It can also be appreciated that the key to the extremely small feedback overhead is the sparseness of the multipaths, or more accurately, the sparseness of the multipath clusters, each cluster having such densely spaced multipaths that it can be considered to be a single effective multipath. The sparseness of the multipaths in wireless channels has been validated by many years of successful operations of cellular networks. For example, the rake receiver is based on the sparseness of the multipaths, and has been a core component in 3G cellular networks. The much improved feedback efficiency is achieved irrespective of the delay spread of the channel.

Data compression techniques can be applied to the time-domain parameters prior to feedback. For example, L and $\tau_l$'s in general change more slowly than $\alpha_l$'s. Thus L and $\tau_l$'s can be fed back at lower rate than $\alpha_l$'s. As another example, $\tau_l$'s and $\alpha_l$ can be vector-quantized instead of individually and independently quantized.

Figure 3:
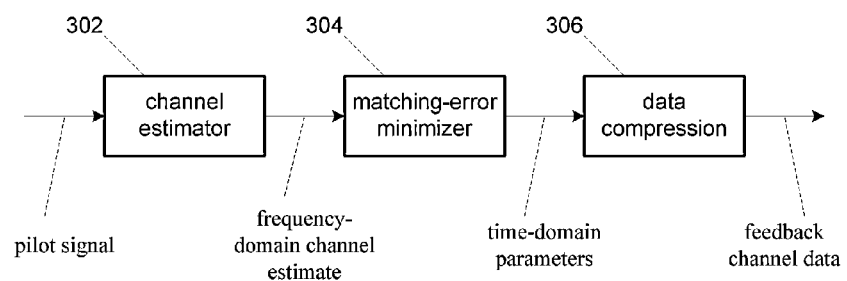
FIG. 3 illustrates an example block diagram for the time-domain parameter feedback with minimization of the frequency-domain matching error.

FIG. 3 illustrates an example block diagram for the time-domain parameter feedback with minimization of the frequency-domain matching error. Channel estimator 302 estimates the channel in the frequency domain from the pilot signal. Averaging over multiple OFDM symbols and/or time-domain trimming may be used in channel estimator 302 to improve the channel estimation accuracy. Matching-error minimizer 304 extracts the time-domain parameters from the frequency-domain channel estimate by minimizing a frequency-domain matching error that is a function of the time-domain parameters. Data compression apparatus 306 applies data compression techniques to the extracted time-domain parameters. The output of data compression apparatus 306 is the channel data that can be fed back.

According to some aspects, the full-scale minimization in Eq. (3) can be replaced with a recursive minimization defined as follows:

$$\text{minimize } J_l(\alpha_l, \tau_l \mid \alpha_0, \ldots, \alpha_{l-1}, \tau_0, \ldots, \tau_{l-1}) = \quad (4)$$

$$\sum_{k=0}^{K-1} |\alpha_l e^{-j\omega_k \tau_l} + \varepsilon_{l-1,k}|^p$$

where $J_l(\alpha_l, \tau_l \mid \alpha_0, \ldots, \alpha_{l-1}\tau_0, \ldots, \tau_{l-1})$ is referred to as the frequency-domain matching error at iteration l, and $$\varepsilon_{l-1,k} = \sum_{m=0}^{l-1} \alpha_m e^{-j\omega_k \tau_m} - H_k, \varepsilon_{-1,k} = -H_k \quad (5)$$

is referred to as the mismatch in the frequency domain at recursion l−1. The recursive minimization in Eq. (4) seeks the minimum over $\alpha_l$ and $\tau_l$, given $\alpha_0, \ldots, \alpha_{l-1}$ and $\tau_0, \ldots, \tau_{l-1}$ from previous recursions. This is in contrast to the minimization problem in Eq. (3), where the minimization is over $\alpha_0, \ldots, \alpha_{L-1}, \tau_0, \ldots, \tau_{L-1}$, and L. As a result, minimization in Eq. (4) requires much less computations than the full-scale minimization in Eq. (3). When the error norm p=2, the frequency-domain matching error in Eq. (4) can be further simplified as $$J_l(\alpha_l, \tau_l \mid \alpha_0, \ldots, \alpha_{l-1}, \tau_0, \ldots, \tau_{l-1}) = \quad (6)$$

$$J_{l-1}(\alpha_{l-1}, \tau_{l-1} \mid \alpha_0, \ldots, \alpha_{l-2}, \tau_0, \ldots, \tau_{l-2}) +$$

$$K|\alpha_l|^2 - 2\sum_{k=0}^{K-1} \text{Re}\{\alpha_l e^{-j\omega_k \tau_l} \varepsilon_{l-1,k}^*\}$$

It follows that minimization of Eq. (6) can be written as $$\underset{\alpha_l, \tau_l}{\text{minimize }} K|\alpha_l|^2 - 2\sum_{k=0}^{K-1} \text{Re}\{\alpha_l e^{-j\omega_k \tau_l} \varepsilon_{l-1,k}^*\} \quad (7)$$

The solution for $\tau_l$ of Eq. (7) is as follows:

$$\underset{\tau_l}{\text{argmax}} \left| \sum_{k=0}^{K-1} \varepsilon_{l-1,k} e^{j\omega_k \tau_l} \right|^2 \quad (8)$$

Many efficient algorithms exist for solving Eq. (8). Once $\tau_l$ is solved, the solution for $\alpha_l$ of Eq. (7) is given by $$\alpha_l = \frac{1}{K} \sum_{k=0}^{K-1} \varepsilon_{l-1,k} e^{j\omega_k \tau_l} \quad (9)$$

The recursive minimization in Eq. (4) makes it convenient to determine the number of multipaths L. For example, the recursion can be stopped if the frequency-domain matching error goes below a certain threshold. The recursion can also be stopped if there is no significant difference in the frequency-domain matching errors between consecutive recursions, which may indicate that more recursions with more multipaths may not yield meaningful improvement. Then the number of recursions can be considered to be the effective number of multipaths. The condition under which the recursion is stopped is referred to as the stopping criterion.

Figure 4:
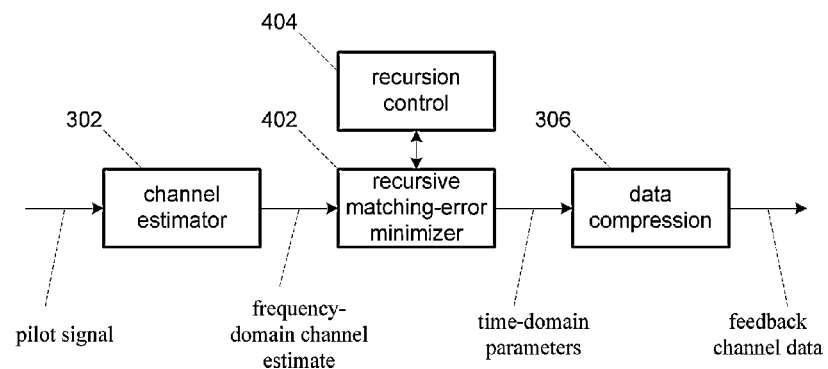
FIG. 4 illustrates an example block diagram for the time-domain parameter feedback with recursive minimization of the frequency-domain matching error.

FIG. 4 illustrates an example block diagram for the time-domain parameter feedback with the recursive minimization of the frequency-domain matching error. Recursive matching-error minimizer 402 replaces matching-error minimizer 304 in FIG. 3. Recursion control apparatus 404 controls when to stop the recursion.

The results of the recursive minimization can be further refined. For example, the time-domain parameters from the recursive minimization can be used as an initial guess for the full-scale minimization in Eq. (3). Many algorithms, such as Newtonian method, exist for solving the minimization in Eq. (3) with an initial guess. That the solution of the recursive minimization is refined can be seen from the fact that the frequency-domain matching error from Eq. (3) is no larger, and in general, smaller than that from Eq. (4).

Alternatively, the frequency-domain matching error can be minimized given the solved multipath delays $\tau_0, \ldots, \tau_l$ from the recursive minimization:

$$\text{minimize } J(\alpha_0, \ldots, \alpha_l \mid \tau_0, \ldots, \tau_l) = \sum_{k=0}^{K-1} \left| \sum_{m=0}^{l} \alpha_m e^{-j\omega_k \tau_m} - H_k \right|^p \quad (10)$$

That is, the minimization is over the multipath amplitudes $\alpha_0, \ldots, \alpha_l$ while the multipath delays $\tau_0, \ldots, \tau_l$ are fixed during minimization. For p=2, the solution to Eq. (10) is given by $$\alpha = (E^H E)^{-1} E^H H \quad (11)$$

where $\alpha = (\alpha_0, \ldots, \alpha_l)^T$, $H = (H_0, \ldots, H_{K-1})^T$, E is a matrix whose (k,m)-th element is $e^{-j\omega_k \tau_m}$, and $E^H$ denotes the Hermitian transpose of E. That the solution of the recursive minimization is refined can be seen from the fact that the frequency-domain matching error from Eq. (10) is no larger, and in general, smaller than that from Eq. (4).

Figure 5:
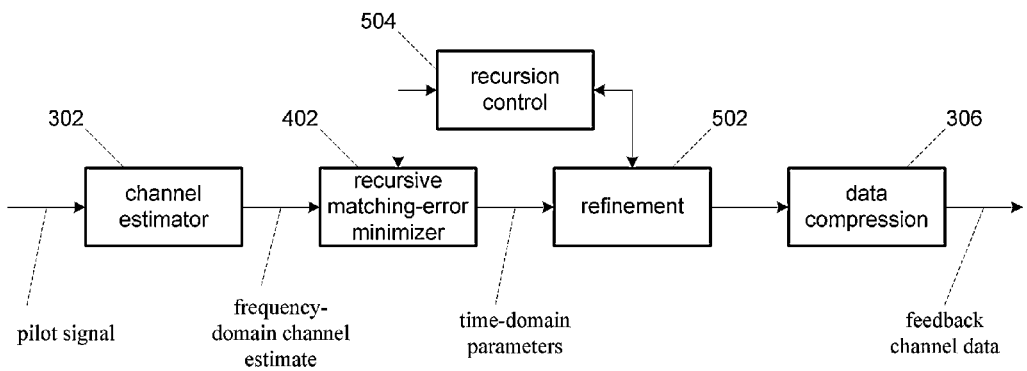
FIG. 5 illustrates an example block diagram for the time-domain parameter feedback with the recursive minimization and the time-domain parameter refinement.

FIG. 5 illustrates an example block diagram for the time-domain parameter feedback with the recursive minimization and the time-domain parameter refinement. Refinement apparatus 502 further improves the time-domain parameter from recursive matching-error minimizer 402. Refinement apparatus 502 can use the time-domain parameters from recursive matching-error minimizer 402 as the initial guess to solve the full-scale minimization in Eq. (3). Alternatively, it can use the multipath delays from recursive matching-error minimizer 402 to obtain the refined multipath amplitudes that minimize the frequency-domain matching error as shown in Eq. (10). Recursion control 504 controls when to stop the recursion. Recursion control 504 can also schedule the refinement such that the time-domain parameters are refined either after the completion of the recursive minimization, or after each recursion during the recursive minimization.

According to some other aspects, the frequency-domain channel is transformed into the discrete time domain. Each point in the discrete time domain is referred to as a channel tap. Then a number of the channel taps are selected, their indices and amplitudes determined according to various criteria. It should be noted that the time-domain parameters have a slightly different definition in the discrete time domain. In the continuous time domain, the continuous time-domain parameters are the number of multipaths, multipath delays, and multipath amplitudes. In the discrete time domain, the discrete time-domain parameters are the number, indices, and amplitudes of the channel taps.

It should be noted that there can be infinitely many non-zero channel taps even if there are only a finite number of multipaths, due to the possible misalignment between the multipath delays and the discrete grid in the time domain. However, the sparseness of the multipath dictates that the channel energy is concentrated on only a few strong channel taps, which is the bases of the time-domain parameters feedback in the discrete time domain, as described next. Hereinafter term "time domain" will be used for either continuous or discrete time domain when the context is clear, and term "discrete time domain" will be used when it is necessary to distinguish from the continuous time domain.

Transforming the frequency-domain channel samples $H_0, H_1, \ldots, H_{K-1}$ to the time-domain channel samples can be done via the IDFT. This requires that the frequency-domain channel samples be uniformly spaced. If the frequency-domain channel samples are not uniformly spaced, as is the case in certain pilot subcarrier arrangements in LTE, various interpolation algorithms can be used to derive a set of uniformly spaced frequency-domain channel samples from the original set of non-uniformly spaced frequency-domain channel samples prior to the IDFT.

Generally the size N of the IDFT is not necessarily the same as the frequency-domain sample size K. Herein the case where K=N is considered first. Let $h_0, h_1, \ldots, h_{N-1}$ be the time-domain outputs from the IDFT, i.e., $$h_n = \frac{1}{N} \sum_{k=0}^{N-1} H_k e^{j2\pi nk/N} \quad (12)$$

Let $M_1$ be the number of the channel taps to be fed back. The determination of $M_1$ will be described later. The $M_1$ channel taps are selected based on a strength function $s(h_n)$ of the time-domain channel samples $h_n$, n=0, 1, ..., N−1. The strength function $s(h_n)$ characterizes the "strength" of $h_n$. The following are a few examples of the choices for the strength function:

$$s(h_n) = |Re\{h_n\}| + |Im\{h_n\}| \quad (13)$$

$$s(h_n) = \max(|Re\{h_n\}|, |Im\{h_n\}|) \quad (14)$$

$$s(h_n) = Re^2\{h_n\} + Im^2\{h_n\} \quad (15)$$

The strength function in Eq. (15) is the energy or power of the time-domain channel sample $h_n$. It can be appreciated that other strength functions can be used as well. For two time-domain channel samples $h_{n_1}$ and $h_{n_2}$, $h_{n_1}$ is said to be stronger than $h_{n_2}$ if $s(h_{n_1}) > s(h_{n_2})$. One approach to selecting the channel taps is to choose the first $M_1$ strongest time-domain channel samples as the channel taps. The selected channel taps are characterized by their indices and amplitudes, i.e., $\{h_n, n \in T_1\}$, where $T_1$ is the index set of the first $M_1$ strongest channel taps, and $|T_1| = M_1$. This approach is referred to as the strongest channel-tap feedback.

The number of feedback channel taps $M_1$ can be determined such that the $M_1$ channel taps capture a certain percentage of the total strength of the time-domain channel samples, i.e., $$\sum_{n \in T} |h_n|^p \geq \lambda \sum_{n=0}^{N-1} |h_n|^p \quad (16)$$

where $0 < \lambda < 1$. For example, $\lambda$ can be chosen to be 0.9, 0.99, or 0.999. When p=2, Eq. (16) means that the selected channel taps capture $\lambda$ of the total energy (or power). It can be appreciated that $|h_n|$ in Eq. (16) can be replaced with the strength function $s(h_n)$. If the information on the channel delay spread $L_{ch}$ is available, the summation on the right hand side of Eq. (16) can be from 0 to $L_{ch}$. Accordingly, the channel taps can be selected over indices $0, 1, \ldots, L_{ch}$, instead of $0, 1, \ldots, N-1$.

When the channel estimation noise is taken into account, $M_1$ can be further reduced, as more feedback channel taps do not necessarily improve the feedback quality due to the channel estimation error. With the presence of the estimation noise, the total average energy of the time-domain channel samples can be expressed as $$V = E\left\{ \sum_{n=0}^{N-1} |h_n|^2 \right\} = E\left\{ \sum_{n=0}^{N-1} |\bar{h}_n + u_n|^2 \right\} = V_C + V_N \quad (17)$$

where $\bar{h}_n$ is the true channel amplitude, $u_n$ is the estimation noise, $V_C$ and $V_N$ are true channel energy, and estimation noise energy, respectively. $V_C$ and $V_N$ will simply be referred to as channel energy and the noise energy hereinafter. From Eq. (17), the total energy of the time-domain channel samples is the sum of the channel energy and the noise energy. To capture λ of the channel energy on average, the following relation should be satisfied:

$$\sum_{n \in T} |h_n|^2 \geq \lambda V_C + \frac{M_1}{N} V_N = \lambda V - \left(\lambda - \frac{M_1}{N}\right) V_N \quad (18)$$

In general, λ is close to 1 and $M_1 \ll N$. Then it can be observed from Eq. (18) that capturing λ of the channel energy requires fewer channel taps than capturing λ of the total energy of the time-domain channel samples.

To utilize Eq. (18) to determine $M_1$, the noise energy $V_N$ need to be estimated. Since in wireless channels the channel energy tends to be concentrated on only a few time-domain channel samples, most of the time-domain channel samples will consist of the noise only. One approach to estimating $V_N$ is to use $M_2$ least strong time-domain channel samples according to the strength function. Let $T_2$ is the index set of the $M_2$ least strong time-domain channel samples, and $|T_2|=M_2$. Then $V_N$ can be estimated from the following:

$$\sum_{n \in T_2} |h_n|^2 \approx \frac{M_2}{N} V_N \quad (19)$$

The estimate of $V_N$ can also be averaged over multiple channel estimation sessions to further improve the estimation accuracy, if the statistics of the channel estimation error do not change rapidly in time.

It can be appreciated that the methods for determining $M_1$ described above do not depend on the delay spread of the channel. It is therefore applicable to channels with various delay spreads, short and long.

$M_1$ can be alternatively determined according to the channel delay profile, or other a priori knowledge on a "good" range for $M_1$. Such a priori knowledge may be derived from the past feedback performance.

Figure 6:
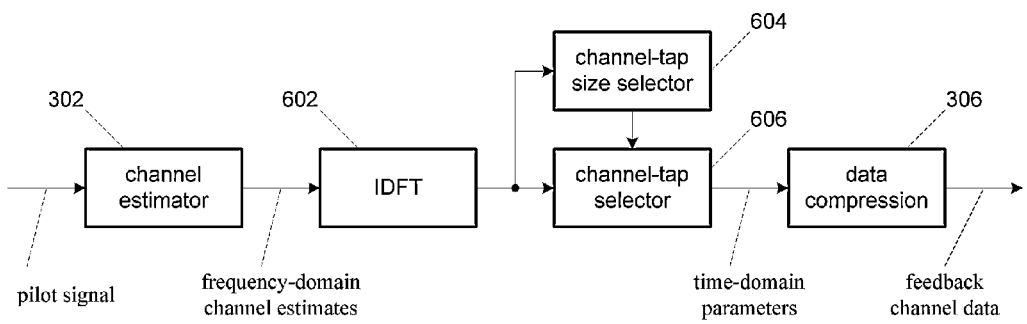
FIG. 6 illustrates an example block diagram for the strongest channel-tap feedback.

FIG. 6 illustrates an example block diagram for the strongest channel-tap feedback. Channel estimator 302 estimates the channel in the frequency domain from the pilot signal. If the frequency-domain channel samples are not uniformly spaced, channel estimator 302 also derives a set of uniformly spaced frequency-domain channel samples from the original set of non-uniformly spaced frequency-domain channel samples. IDFT apparatus 602 transforms the uniformly spaced frequency-domain channel samples into the time domain. Channel-tap size selector 604 determines the number of the channel taps for feedback. Channel-tap selector 606 selects the channel taps according to their strengths. The amplitude of a selected channel tap is its IDFT value. Data compression apparatus 306 applies similar data compression techniques to the time-domain parameters in the discrete time domain.

In many applications, the IDFT size N≠K. For example, in a 20-MHz LTE system, there are 1201 subcarriers. The IDFT size of the same system is 2048. Since the channel can only be estimated via available subcarriers, there are at most 1201 frequency-domain channel samples, the rest of the 2048 inputs are unknown. Thus the IDFT cannot proceed since the input data is incomplete.

Figure 7:
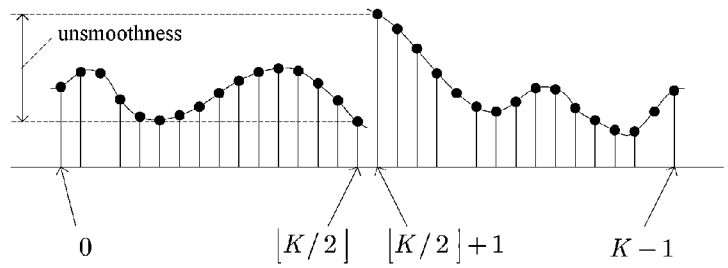
FIG. 7 illustrates the spectrum unsmoothness phenomenon.

One way to get around the incomplete input problem is to make the size of the IDFT to be always the same as the size of the frequency-domain channel samples. Such an approach has several shortcomings. First, changing the size of the IDFT changes the time-domain sample rate. An additional sample rate conversion will have to be performed in the time domain to restore the original sample rate, thereby incurring additional computations. Second, using the size of the frequency-domain channel samples as the size of the IDFT may not have an efficient implementation. For example, in the above mentioned the 20-MHz LTE system, a 1201-point IDFT may require more than 60 times as many computations as a 2048-point IDFT does, since the latter can be efficiently computed by fast Fourier transform (FFT), while the former cannot. Third, the channels at the both edges of the signal band are generally independent. In discrete frequency domain, the edge frequencies correspond to frequency indices $\lfloor K/2 \rfloor$ and $\lfloor K/2 \rfloor+1$, where $\lfloor x \rfloor$ denotes the largest integer not exceeding x. The two independent channel values at those two indices create "unsmoothness" of the spectrum, as shown in FIG. 7. The spectrum unsmoothness causes the channel energy spread over more channel taps, i.e., more channel taps are needed to capture a predetermined percentage of the channel energy when there is spectrum unsmoothness, thereby increasing the feedback overhead.

Figure 8:
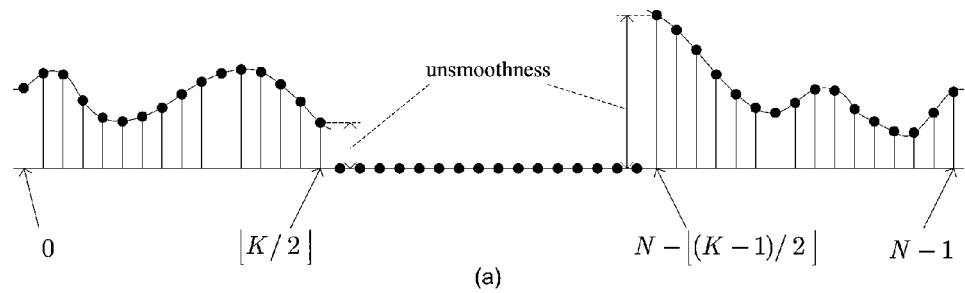
FIG. 8 illustrates some fill-in options for the incomplete input of the IDFT.
Figure 8:
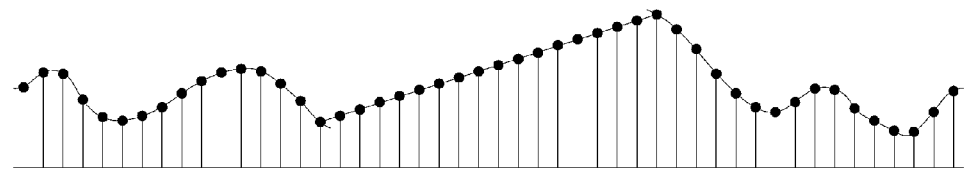
Figure 8:

To use the IDFT size N≠K, the unknown frequency-domain channel samples in the input need to be filled in. FIG. 8 illustrates some spectrum fill-in options for the incomplete input of the IDFT. FIG. 8(a) shows a zero spectrum fill-in option, which fills zeros in the positions of unknown channel samples. While the zero fill-in option allows use of the original IDFT size N, it creates spectrum unsmoothness between the filled-in zeros and the known channel samples as shown in FIG. 8(a), thereby requiring many more feedback channel taps. FIG. 8(b) shows a smooth spectrum fill-in option, which eliminates the spectrum unsmoothness. With the smooth spectrum fill-in, fewer feedback channel taps are needed. In FIG. 8(b), the smooth spectrum fill-in uses linear interpolation for the unknown channel samples between the known channel samples. It can be appreciated that other types of interpolation can be used as well.

FIG. 8(c) shows an additional option, referred to as frequency masking. A filled-in spectrum, such as the one in FIG. 8(b), can be multiplied by the smooth frequency mask in FIG. 8(c). An example frequency mask shape is raised cosine.

In the above 20-MHz LTE example, N=2048 and K=1201. It can be appreciated that N is not restricted to be the lowest number of the form $N=2^b$ above K. For example, For K=1201, N can also be 4096, 8192, or any other convenient choice not in the form of $N=2^b$.

Figure 9:
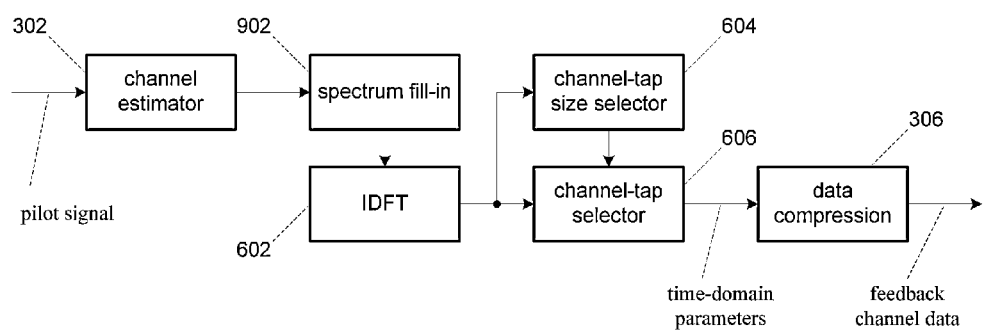

FIG. 9 illustrates an example block diagram of the strongest channel-tap feedback with spectrum fill-in. Spectrum fill-in apparatus 902 takes the estimated frequency-domain channel samples from channel estimator 302, and fills in the unknown frequency-domain channel samples if necessary. The output of spectrum fill-in apparatus 902 then goes to IDFT apparatus 602.

According to some further aspects, the frequency-domain matching error and/or the number of the channel taps can be further reduced for the strongest channel-tap feedback. Let S be the index set of the estimated frequency-domain channel samples. The frequency-domain matching error can be minimized over the amplitudes of the channel taps, given the index set T of the channel taps:

$$\text{minimize } J(\{h_n, n \in T\} \mid T) = \sum_{k \in S} \left| \sum_{n \in T} h_n e^{-j2\pi nk/N} - H_k \right|^p \quad (20)$$

Let $\{\tilde{h}_n, n \in T\}$ be the solution to Eq. (20), then time-domain parameters for feedback are T and $\{\tilde{h}_n, n \in T\}$. Note that the index set T includes the number of the channel taps and the indices of the channel taps, and $\{\tilde{h}_n, n \in T\}$ are the amplitudes of the channel taps. It should be noted that $\{\tilde{h}_n, n \in T\}$ is the MSE solution when the error norm p=2. Minimization in Eq. (20) over the amplitudes of the channel taps given their index set T is referred to as the refinement of the channel taps.

Figure 10:
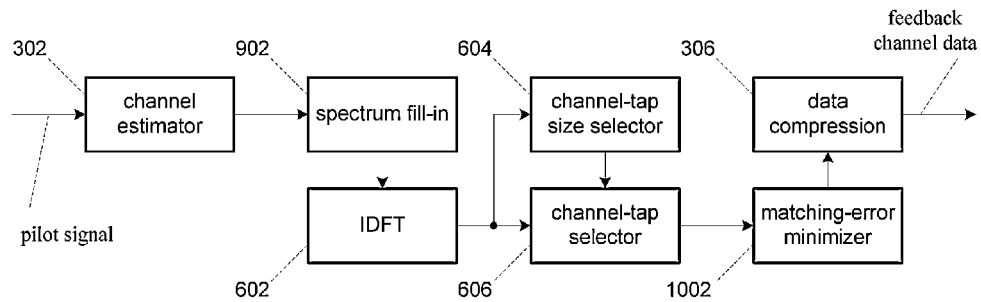
FIG. 10 illustrates an example block diagram of the strongest channel-tap feedback with minimized frequency-domain matching error.

FIG. 10 illustrates an example block diagram of the strongest channel-tap feedback with minimized frequency-domain matching error. Matching-error minimizer 1002 uses the channel-tap indices from channel-tap selector 606 to calculate the amplitudes of the channel taps that minimize Eq. (20). Note that in FIG. 10, the solution to Eq. (20) replaces the IDFT outputs as the amplitudes of the channel taps. The minimized frequency-domain matching error is generally much lower than the frequency-domain matching error of the IDFT outputs. For a given frequency-domain matching error, the solution to Eq. (20) requires many fewer channel taps than use of the IDFT outputs does, thereby further reducing the feedback overhead.

In theory, the solution to Eq. (20) always has smaller frequency-domain matching error than that of the IDFT outputs. Due to the finite numerical precision in implementations, however, the solution to Eq. (20) from finite-precision computations may sometimes make the frequency-domain matching error worse. This may happen when the number of the channel-taps is large, and Eq. (20) is ill-conditioned. In such situations, the IDFT outputs can be used as a "fallback" solution for the amplitudes of the channel taps. Specifically, if the actual frequency-domain matching error of the solution to Eq. (20) is larger than that of the IDFT outputs, the IDFT outputs at the indices of the channel taps are used as the amplitudes of the channel taps.

CONCLUSION, RAMIFICATIONS, AND SCOPE

Accordingly it will be seen that using the time-domain parameters for channel feedback reduces the feedback overhead to a small fraction of what the prior art would require, thereby providing a feasible path to implementing multipoint broadcasting in LTE networks, and making multi-fold capacity improvement of the cellular networks possible.

The time-domain parameter feedback works equally well on wireless channels of various delay spreads, short or long, and provides consistently superior feedback efficiency under wide ranges of channel conditions.

Various aspects of the subject disclosure are described with a scalar channel, i.e., the channel between a single transmitter and a single receiver. It is to be understood and appreciated that the principles of the subject disclosure also apply to vector and matrix channels, such as the multipoint-broadcasting channels and MIMO (multi-input multi-output) channels.

Various aspects of the subject disclosure are described with LTE cellular networks. It is to be understood and appreciated that the principles of the subject disclosure also apply to other wireless networks and systems, such as wireless local area network (WLAN).

While the foregoing disclosure describes illustrative aspects and/or embodiments, it should be noted that various changes and modifications could be made herein by those skilled in the art without departing from the scope of the described aspects and/or embodiments as defined by the appended claims. Furthermore, all or a portion of any aspect and/or embodiment can be utilized with all or a portion of any other aspect and/or embodiment, unless stated otherwise. It is, therefore, to be understood that the appended claims are intended to cover all such modifications, changes, and combinations as fall within the true spirit and the scope of the disclosed subject matter.

What is claimed is:

1. A method for channel information feedback, comprising:
   (a) generating a plurality of frequency-domain channel estimates of a channel at a plurality of frequencies,
   (b) forming a frequency-domain matching error between a continuous time-domain channel model and said frequency-domain channel estimates, said continuous time-domain channel model comprising a set of continuous time-domain parameters, said set of continuous time-domain parameters comprising number of multipaths, multipath delays, and multipath amplitudes,
   (c) extracting said set of continuous time-domain parameters by minimizing said frequency-domain matching error with recursive minimization,
   (d) refining said set of continuous time-domain parameters, and
   (e) feeding back said set of continuous time-domain parameters,
   whereby said set of continuous time-domain parameters requires smaller amount of data than said channel estimates at said plurality of frequencies do.

2. The method of claim 1, wherein refining said set of continuous time-domain parameters further comprises performing full-scale minimization with said set of continuous time-domain parameters from said recursive minimization as an initial guess.

3. The method of claim 1, wherein refining said set of continuous time-domain parameters further comprises minimizing said frequency-domain matching error with said multipath delays from said recursive minimization to further refine said multipath amplitudes.

4. The method of claim 1, wherein said recursive minimization is stopped when said frequency-domain matching error is below a predetermined threshold.

5. The method of claim 1, wherein said recursive minimization is stopped when difference between frequency-domain matching errors of last recursion and previous recursion is within a predetermined range.

6. The method of claim 1, wherein said number of multipaths is number of recursions in said recursive minimization.

7. The method of claim 1, further comprising applying data compression techniques to said set of continuous time-domain parameters.

8. A method for channel information feedback, comprising:
   (a) generating a plurality of frequency-domain channel estimates of a channel at a plurality of frequencies,
   (b) transforming said frequency-domain channel estimates into time domain to obtain a plurality of time-domain channel samples,
   (c) selecting a plurality of channel taps from said time-domain channel samples according to a strength function of said time-domain channel samples, said strength function being an indicator of energy, power, or magnitude of amplitude of said time-domain channel samples, (d) refining amplitudes of selected channel taps by minimizing a frequency-domain matching error given indices of said selected channel taps, (e) forming a set of discrete time-domain parameters comprising number, indices, and amplitudes of said selected channel taps, said amplitudes of said selected channel taps having been refined in step (d), and (f) feeding back said set of discrete time-domain parameters, whereby said set of discrete time-domain parameters requires smaller amount of data than said channel estimates at said plurality of frequencies do.

9. The method of claim 8, wherein transforming said channel estimates further comprises converting said channel estimates at said plurality of said frequencies, if said plurality of said frequencies are not uniformly spaced, to new channel estimates at a plurality of new uniformly spaced frequencies.

10. The method of claim 8, wherein transforming said frequency-domain channel estimates uses inverse discrete Fourier transform, whereby said time-domain channel samples are the output of said inverse discrete Fourier transform.

11. The method of claim 10, wherein transforming said channel estimates further comprises performing spectrum fill-in on-t frequencies of unknown channel samples, if the number of said channel estimates is smaller than the size of said inverse discrete Fourier transform.

12. The method of claim 11, wherein said spectrum fill-in is smooth spectrum fill-in.

13. The method of claim 12, wherein said smooth spectrum fill-in uses linear interpolation for said unknown channel samples.

14. The method of claim 11, wherein said spectrum fill-in further comprises multiplying a frequency mask to the filled-in spectrum.

15. The method of claim 8, wherein said strength function is the energy of said time-domain channel sample.

16. The method of claim 8, wherein said plurality of said channel taps capture a predetermined percentage of the total strength of said time-domain channel samples.

17. The method of claim 8, wherein said plurality of said channel taps capture a predetermined percentage of channel energy.

18. The method of claim 17, further comprising:
(a) estimating noise energy from a predetermined number of least strong time-domain channel samples, and
(b) estimating said channel energy from a difference between the total energy of said time-domain channel samples and said noise energy.

* * * * *